United States Patent Office 3,337,487
Patented Aug. 22, 1967

---

3,337,487
REACTIVE END-GROUP POLYMERS AND PREPARATION THEREOF
Edwin J. Vandenberg, Wilmington, Del., assignor to Hercules Incorporated, a corporation of Delaware
No Drawing. Filed July 29, 1963, Ser. No. 298,434
14 Claims. (Cl. 260—79)

This invention relates to a new process of preparing polymers having at least two terminal active hydrogen groups and more particularly to a process of cleaving high molecular weight polyethers, polythioethers, and polyimines to form lower molecular weight polymers having functional groups on each end of the polymer molecules and to the new double ended polymers so produced.

High molecular weight polyethers prepared by the polymerization of oxiranes, oxetanes, etc., are well known. However, these polymers contain at best no more than one active hydrogen end group per molecule. In high molecular polymers this amount of active hydrogen concentration is so low as to be essentially ineffective as a means of modifying the polymer and in many cases cannot be detected. Obviously, any means by which the active hydrogen content of the polymer molecule can be increased, greatly enhances the utility of the polymer.

Low molecular weight, essentially linear, polymers, as for example polymers having a number average molecular weight (Mn) of 1,000 to 10,000, with reactive terminal groups are unique materials. Because of their low molecular weight, they have very low viscosity above their softening or melting point. This makes it very easy to mix them with chain-extending agents, fillers, antioxidants, light stabilizers, etc., and results in very easy fabrication, even of complex parts. The reactive end-groups make it possible to build the molecular weight back up (up to an infinite, cross-linked network, if desirable), during or after fabrication by reaction with di- or polyfunctional agents to give excellent mechanical properties. Terminal reactive groups are greatly preferred since the polymer chain, after appropriate chain extension, is of maximum value in obtaining good mechanical properties, whereas dangling chain ends or branches would be present if the reactive groups were not terminal and would not contribute to good mechanical properties. Since the actual amount of reaction in the final chain-extending step is very small, there is very little heat of reaction and very little shrinkage, whereas both of these factors would be excessively large if pure monomer were polymerized directly; in fact so much so that this approach is usually impractical. Because of this low heat of reaction and low shrinkage, large and/or complex parts and articles can be fabricated accurately and without difficulty.

Now, in accordance with this invention, it has been found that high molecular weight polyethers, polythioethers and polyimines can be cleaved by reacting the polymer with an organometallic compound of an alkali metal and obtain lower molecular weight polymers containing an active hydrogen end group on each end of the polymer molecule.

The theory of this invention is illustrated by the following equations for the cleavage of poly(propylene oxide) with an organolithium compound (LiR), wherein abstraction of hydrogens on a carbon atom beta to the ether linkage leads to cleavage. As will be seen, there are, for any given ether linkage in the polymer chain of poly(propylene oxide), three positions wherein a hydrogen is attached to a carbon beta to the ether linkage, hence there are three possible chain cleavage reactions, two involving cleavage on the left side of the ether linkage and one involving cleavage on the right side of the ether linkage. The three cleavage reactions involving these three beta hydrogens ($\beta_1$, $\beta_2$ and $\beta_3$) are shown below, for two units in the polymer chain, the remainder of the polymer chain being R' and R'' in these equations.

Left Side Cleavage

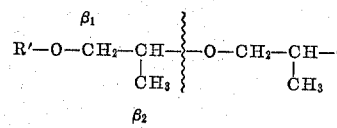

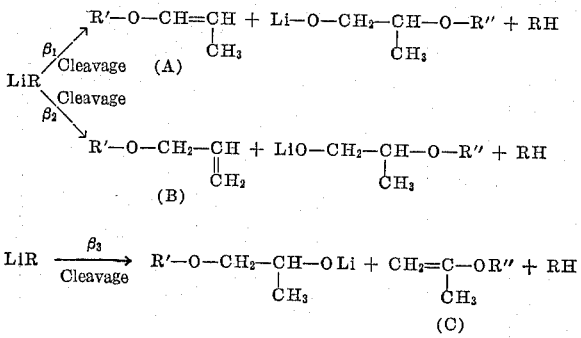

Right Side Cleavage

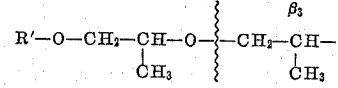

The lithium alkoxide end groups, which are one half of the total end groups, are readily converted by washing with an active hydrogen compound, such as water, acid, alcohol, etc., to hydroxyl groups. The propenyl end-groups (labeled A above) and the isopropenyl end-groups (labeled C above) are very readily converted to a hydroxyl end-group by acid-washing. The low molecular weight by-product aldehyde (acetaldehyde) and ketone (acetone) are readily water-washed or volatilized out of the product. The allyl end-group (labeled B above) would not be removed by mild acid washing as used herein. Thus, it was surprising that this type of end-group is not found in the cleavage product. Presumably, it isomerizes under the influence of the cleavage agent or LiOR product to form a propenyl ether group (A) which is readily removed by acid hydrolysis. It might also have been expected that LiR might add to the double bond end groups to ultimately give an ether end group rather than a hydrolyzable vinyl ether-type end group. Thus, it was surprising to find that only hydroxyl end groups were found in the acid-washed products of this invention and that the number of hydroxyls correspond exactly to 2 per chain.

As pointed out above, it is essential that there be at least one hydrogen attached to a carbon beta to the ether, thioether, or imino group in order for the polymer to be cleaved in accordance with this invention to produce reactive end groups on both ends of the polymer chain, one the OH, SH or NH group and the other an ethylenically unsaturated group. If a product having OH, SH or NH groups on both ends of the polymer chain is desired, a further requirement is that the polymer being cleaved must be of such a nature that it is possible to isomerize the initially formed double bond into conjugation with the ether, thioether, or imino group to which it is attached. This requires at least one isomerization path to the O, S or N atom in which every carbon bears at least one hydrogen atom. Thus, while a polymer having β hydrogens and otherwise with fully substituted main chain carbons can be cleaved by the process of this invention, the product will have reactive end groups, but it is not always possible to hydrolyze off all of the unsaturated end groups so as to produce only polymers with —OH, —SH or >NH groups on both ends of the polymer. Exemplary of polymers which cannot yield products in which every molecule has OH's on each end of the chain, but rather where at least part of the molecules have one OH end group and one unsaturated end group are: poly(tetramethyl ethylene oxide), poly(2,2-dimethyloxetane), etc.

Thus, in accordance with this invention, any polyether, polythioether or polyimine containing monomer units in the polymer chain that have at least one hydrogen in the beta position to an ether, thioether or imine group can be cleaved to produce a polymer having reactive groups on both ends of the polymer chain. Those polyethers, polythioethers and poly(N-substituted imines) useful in the cleavage process of this invention will contain sequences of at least 2 and preferably at least 5 monomer units having the following general formula:

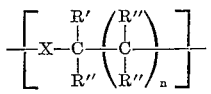

where X is O, S, or NR, where R is alkyl, cycloalkyl, aryl, aralkyl, alkoxyalkyl, or together with R' forms a cyclic structure; R' is H, alkyl, alkenyl, aholalkyl, cycloalkyl, aryl, aralkyl, alkoxyalkyl, aryloxyalkyl, alkenyloxyalkyl, alkenylaryloxyalkyl; each R" is any one of H, alkyl, alkenyl, alkoxyalkyl, alkenyloxyalkyl, haloalkyl, or alkenylaryloxyalkyl; or any two of R' and R" can together form a cyclic structure; at least one of said R' and R" groups in said sequences of said monomer units providing a hydrogen attached to a carbon in the beta position to X; and $n$ is any whole number of 1 or more and preferably is 1 to 4.

Exemplary of the polymers that can be cleaved in accordance with this invention are the homopolymers and copolymers of any two or more epoxides, such as the alkylene oxides as, for example, ethylene oxide, propylene oxide, butene-1 oxide, cis- and trans-butene-2 oxide, isobutylene oxide, dodecene-1 oxide, octadecene-1 oxide, etc., cyclohexene oxide, 1,4-epoxycyclohexane, cyclooctene oxide, cyclododecene oxide, 1,2-epoxycyclooctene-5, cyclododecatriene monoxide, styrene oxide, the epihalohydrins such as epichlorohydrin, epifluorohydrin, epibromohydrin, etc., 1,1-bis(chloromethyl) ethylene oxide, 1,1,1-trichloro-3,4-epoxybutane, 1,1,1-trifluoro-3,4-epoxybutane, 1,1,1-tribromo-3,4-epoxybutane, etc., 1,4-dimethoxy-2,3-epoxybutane; tetramethyl ethylene oxide, alkyl glycidyl ethers such as methyl glycidyl ether, isopropyl glycidyl ether, tert-butyl glycidyl ether, trifluoromethyl glycidyl ether, etc., aryl glycidyl ethers such as phenyl glycidyl ether, chlorophenyl glycidyl ether, etc., ethylenically unsaturated epoxides such as butadiene monoxide, allyl glycidyl ether, allylphenyl glycidyl ether, crotyl phenyl glycidyl ether, 1,2-divinyl ethylene oxide, 4,5-epoxy-1,7-octadiene, 1,2-bis(allyloxymethyl) ethylene oxide, 1,2-bis(crotylphenoxymethyl) ethylene oxide, etc., oxetanes such as trimethylene oxide, 2- and 3-methyl, ethyl, propyl, isopropyl, butyl, etc., oxetanes, 2,3-dimethyl oxetane, 2,2-dimethyloxetane, 2- and 3-phenyl oxetanes, 2- and 3-benzyl oxetanes, 2- and 3-cyclohexyl oxetanes, 2- and 3-methoxy methyl oxetanes, etc.; tetrahydrofuranes such as tetrahydrofurane, 2-, 3- and 4-methyltetrahydrofurane, 2,3 - dimethyltetrahydrofurane, 2,3,4-trimethyltetrahydrofurane, 2-, 3- and 4-trifluoromethyltetrahydrofurane, 2,3,4 - tris(trifluoromethyl)-tetrahydrofurane, etc.; and the thio and N-substituted imine analogues of any of these epoxides, oxetanes and tetrahydrofuranes, etc. Exemplary of the polythioethers that can be cleaved are the homopolymers and copolymers of such cyclic sulfides as ethylene sulfide (thiirane), propylene sulfide, butene-1 sulfide, cis- and trans-butene-2 sulfide, isobutylene sulfide, dodecene-1 sulfide, octadecene-1 sulfide, cyclohexene sulfide, chloromethyl ethylene sulfide, trifluoromethyl ethylene sulfide, tetramethyl ethylene sulfide, butadiene monosulfide, styrene sulfide, trimethylene sulfide (thietane), 2-methylthietane, 2,2-dimethylthietane, cis- and trans-2,4-dimethylthietane, 2-phenyl thietane, 2-trifluoromethyl thietane, 2-methoxymethyl thietane, 7-thia-bicyclo [3·3·1] heptane, tetrahydrothiophene, pentamethylene sulfide, etc. In addition, polymers of thioaldehydes which have beta hydrogens can also be cleaved, as for example, poly(thioacetaldehyde), poly (thiopropionaldehyde), poly(thiobutyraldehyde), poly (thio-isobutyraldehyde), etc. Exemplary of the poly(N-substituted imines) that can be cleaved are the homopolymers and copolymers of N-alkyl and N-alkenyl ethylene imines (i.e., azirdine) such as N-methyl, ethyl, propyl, isopropyl, n-butyl, isobutyl, tertbutyl, n-hexyl, n-octyl, dodecyl, octadecyl, octadecenyl, allyl etc. ethylene imines, and the corresponding N-alkyl propylene imines, N-alkyl butene-1 imines, cis- and trans-N-alkyl butene-2 imines, N-alkyl isobutylene imines, N-alkyl cyclohexene imines, N-alkyl styrene imines, N-alkyl octadecene-1 imines, N-methoxymethyl ethylene imines, the N-alkyl tetramethyl ethylene imines, N-phenyl ethylene imine, N-tolyl ethylene imine, N-benzyl ethylene imine, N-cyclohexyl propylene imine, etc., and the corresponding N-alkyl, -cycloalkyl, and -aryl trimethylene imines, and tetramethylene imines (pyrrolidine), the N-alkyl, -cycloalkyl and -aryl piperidines, 1-azabicyclo [4·2·0] octane, i.e. conidine, including both the isotactic and atactic polymers, methyl conidine, 6,8-dimethyl conidine, 1,4-diazabicyclo [2·2·2] octane, the N-alkyl 3-azabicyclo [3·2·2] nonane, 7-azabicyclo [2·2·1] heptane, the N-alkyl hexamethylene imines, etc. In addition to the copolymers of any two or more of the above monomers, copolymers which contain only part of the above required units can be used provided that these units occur in sequences of at least 2 and preferably at least 5 and the remainder of the polymer is inert to the cleavage reaction. Exemplary of such polymers are graft copolymers such as vinyl alcohol polymers and copolymers, phenol-formaldehyde resins, etc., in which polymers the hydroxyls have been converted to polyether, polysulfide, or polyimine side chains; block copolymers such as blocks of hydrocarbon units, polyester units and polyamide units, or of polyethers, polysulfides or polyimines which do not have hydrogens beta to the O, S or N, combined with blocks of units having the above formula. Such polymers are, for example, poly(vinyl alcohol) and copolymers of vinyl alcohol with ethylene (hydrolyzed vinyl acetate-ethylene copolymers) where each of the hydroxyl groups has been reacted with ethylene oxide, propylene oxide, ethylene sulfide, propylene sulfide, or N-alkyl ethylene imines to give polyether, polythioether, and poly(N-alkyl imine) side chains of 5 to 100 monomer units. The analogous products derived from soluble phenol-formaldehyde resins may also be cleaved in the same way as can block copolymers such as copolymers of blocks of styrene with ethylene oxide blocks, propylene sulfide blocks or N-methyl ethylene imine blocks, blocks of ethylene terephthalate with ethylene oxide blocks, blocks of formaldehyde with blocks of ethylene oxide, blocks of thioformaldehyde with blocks of ethylene oxide, blocks of thioformaldehye with blocks of N-methyl ethylene imine, etc.

Preferably the polymer that is cleaved will be one of fairly high molecular weight so that the original end groups in the polymer being cleaved are an insignificant part of the total final end groups, and the major portion of the individual polymer molecules in the cleaved product will then have active hydrogen end groups on both ends. The polymer being cleaved will preferably have a chain of at least about 100 of said monomer groups and more preferably at least about 500. The actual molecular weight of the polymer being cleaved and the number of cleavages per polymer molecule desired will, of course, depend on the purpose for which the final polymer is to be used. Thus, if a difunctional polymer is desired for chain extension with a difunctional reactant such as a diisocyanate to form a linear high polymer, this would require a very high percentage of polymer molecules having the active hydrogen group on each end, whereas chain extension with a tri- or higher functionality reactant, such as triisocyanate, to form a cross-linked network would not necessitate that such a high majority of the polymer molecules be double ended. Also, if more than two reactive groups are introduced per chain, as in the case where side chain substituents are cleaved, then the percentage of active ended molecules does not need to be quite as high.

The cleavage process in accordance with this invention is carried out by reacting the above described polymers with an organometallic compound of an alkali metal. Any organometallic compound of an alkali metal, i.e., lithium, sodium, potassium, rubidium or cesium, can be used. The organo moiety will preferably be a hydrocarbon group as, for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyl lithium, lithium acetylide, methylsodium, ethylsodium, propylsodium, isopropylsodium, the butyl sodiums, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl- and butylpotassium, allylpotassium, octylpotassium, phenylpotassium, cyclopentylpotassium, cyclohexenylpotassium, etc. The amount of the organometallic compound used will depend upon the amount of cleavage desired, one molecule of the organometallic being required for each cleavage, i.e., per two chain ends. Thus, the amount of organometallic compound can vary from about 1% up to a large excess, as, for example, 5 to 10 times the weight of the polymer being cleaved, but preferably will vary from about 1% to about 100% by weight of the polymer being cleaved. If the polymer being cleaved has groups reactive to these organometallic compounds, as for example, hydroxyl, ester, etc., groups, then the amount of organometallic used must be in excess of this requirement.

The cleavage process can be carried out in the absence of a diluent, i.e. a bulk process, but preferably is carried out in a diluent which may be a solvent for the polymer being cleaved or which may serve only as a dispersant for the polymer. Any organic liquid diluent that is inert under the reaction conditions can be used as, for example, aromatic hydrocarbons such as benzene, toluene, xylene, etc., aliphatic and cycloaliphatic hydrocarbons such as hexane, n-heptane, cyclohexane, etc., and mixtures of such hydrocarbons as, for example, petroleum ether, gasoline, etc. Diluents that are capable of reaction with the organometallic compound, as for example, ethers, can also be used provided that the rate of reaction of the organometallic with the polymer being cleaved exceeds the rate of reaction with the diluent. The concentration of the polymer in the diluent can vary from a fraction of 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder after which the cleaved fluid product can be handled in more conventional equipment in a continuous process.

The cleavage reaction can be carried out over a wide temperature range, generally from about −50° C. to about 200° C. depending on the reactivity of the polymer and the organometallic compound, the stability of the organometallic compound, etc. Preferably, the reaction is carried out at a temperature of from about −20° C. to about 150° C. and more preferably from about 0° C. to about 125° C. The pressure can be atmospheric, subatmospheric or above atmospheric, if desired. In fact, pressures up to several thousand pounds can be used if needed to keep the diluent in the liquid state.

One of the advantages of the cleavage reaction of this invention is that either a polymer having active hydrogen groups on both ends of the polymer chain or a polymer having an active hydrogen group on one end of the chain and a double bond on the other end can be obtained at will depending on the isolation procedure used. If a product with both a double bond, i.e. an alkenyloxy group, and an active hydrogen chain end, i.e. a —OH, —SH or —NHR group, is desired, then the reaction mixture is washed at the end of the cleavage reaction with water under neutral or slightly alkaline conditions, or the alkali metal can be removed by some other appropriate means such as passing the reaction mixture through an acid ion exchange resin. The product is then recovered by evaporating off the diluent, or by steam distilling off the diluent from an aqueous emulsion or dispersion, or by crystallization, or by precipitation depending on the nature of the product and the planned use of the product. If a product with active hydrogen groups on both ends of the polymer chain is desired, then appropriate conditions must be used to hydrolyze off the double bond or vinylene end groups, i.e. the propenyl, isopropenyl, vinyl or other vinylene, vinylidene, etc., ether, sulfide, or imine groups. This is very readily accomplished in the case of the propenyl or vinyl ether and imine end groups by simply washing the reaction mixture after the cleavage reaction with a weak acid solution as, for example, dilute hydrochloric acid, formic acid, acetic acid, oxalic acid, sulfuric acid, sulfurous acid, nitric acid, sulfonic acid, carbonic acid, etc. In the case of the propenyl and vinyl sulfide end groups, more drastic hydrolysis conditions are sometimes required, as for example, the use of a higher acid concentration and elevated temperature.

The active chain-end polymers can be prepared in molecular weights of from a few monomer units per molecule up to any desired chain length. In general, they will be prepared with a number average molecular weight of from about 600 up to about 50,000. However, the polymer can be cleaved all the way down to monomeric units, if desired. The active chain ends can be —OH, —SH, —NHR, propenyl, isopropenyl, vinyl, or other vinylidene or vinylene, etc., ether, sulfide or imine groups, the active hydrogen-type chain ends being preferred. There are two active chain ends per molecule if the polymer being cleaved is linear with no cleavable side chains. More than two active ends per molecule can be obtained by cleaving polymers with cleavable side chains. The latter can be either ordinary linear polymers with small cleavable main chain substituents or graft polymers having long cleavable side chains.

The high molecular weight polyethers, polythioethers or polyimines that are cleaved can be prepared by any desired means. Polyethers of high molecular weight are readily prepared according to the process of my copending application U.S. Ser. No. 812,079, filed May 11, 1959 now U.S. Patent No. 3,135,705, using as the catalyst an organoaluminum compound reacted with water and preferably with both water and a chelating agent. A typical catalyst preparation is carried out by reacting a solution of the organoaluminum compound, as for example, tri-isobutylaluminum, in a mixture of n-heptane and ether as solvent, with an equimolar amount of acetylacetone as chelating agent and with 0.5 mole of water per mole of aluminum and agitating the mixture at 30° C. for 16 to 20 hours. The polymerization is typically carried out by injecting the catalyst solution so prepared into a solution of the epoxide in an inert diluent and agitating the mixture at room temperature or at elevated temperatures for several hours. Isolation of the polymer will depend on the solubility of the polymer in the reaction diluent, etc.

The following examples illustrate the process of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $\eta_{sp}/C$ determined on a 0.1% solution in chloroform at 25° C. unless otherwise indicated. The number average molecular weight (Mn) was determined in benzene (heating to dissolve the polymer when necessary) using a Mechrolab osmometer. The calculated Mn was calculated from the hydroxyl analysis assuming 2 hydroxyls per chain. Hydroxyl analysis was determined by infrared and/or Zerewitinoff analysis. Where the melting point of the polymer is given, it was determined by differential thermal analysis (DTA).

*Example 1*

The poly(trans-2-buteneoxide) used in this and the following examples was prepared as described in U.S. 3,065,187.

Fifteen (15) parts of a crystalline poly(trans-2-butene oxide) containing 0.1% of phenyl-β-naphthylamine as an antioxidant and having an RSV of 2.1 was dissolved in 255 parts of anhydrous benzene at room temperature. Then, while stirring under nitrogen at 30° C., 0.96 part of lithium butyl in 6 parts of n-hexane was added. After stirring for 15 minutes at 30° C., 6 parts of anhydrous ethanol was added to shortstop the reaction. The reaction mixture was washed with 150 ml. of a 10% aqueous solution of hydrogen chloride, stirred for 15 minutes and then washed neutral with water. The solvent was evaporated, and the product was dried for 16 hours at 80° C. in vacuum. It amounted to 14.2 parts, had an RSV of 0.18 and an Mn of 4364. Infrared analysis showed 0.69% hydroxyl (Mn calculated of 4930) and no unsaturation. Zerewitinoff analysis showed 0.8% hydroxyl (Mn) calculated of 4256). The highly crystalline solid had a melting point of 102° C.

*Example 2*

One part of a crystalline poly(trans-2-butene oxide) essentially free of antioxidant and having an RSV of 1.5 and a melting point of 98° C. was dissolved in 510 parts of n-heptane at 90° C. Then after cooling to 30° C. and while stirring under nitrogen and in a 30° C. bath, 0.14 part of sodium amyl in 10 parts of n-heptane was injected. After 5 minutes' agitation, the reaction was stopped by adding 40 parts of anhydrous ethanol. An equal volume of ether was added and the product was then washed with 250 parts of 3% aqueous hydrogen chloride and then washed neutral with $H_2O$. Solvent was stripped off under vacuum and the product dried 16 hours at 80° C. in vacuum. It amounted to 0.74 part of a soft wax having an RSV of 0.08. Infrared analysis showed it to have an hydroxyl absorption equivalent to 1.6% OH and an absorption at 1632 cm.$^{-1}$ indicating about 1.6% vinylidene end group. Thus, the polymer had both hydroxyl and double bond end groups, the latter because of the insufficient acid washing.

*Example 3*

Example 2 was repeated except that a solution of 7.5 parts of the poly(trans-2-butene oxide) and 245 parts of n-heptane was treated with 1.73 parts of lithium butyl dissolved in 10 parts of n-hexane. The reaction mixture was stirred for 15 minutes at 30° C. before shortstopping it. There was isolated a waxy solid which amounted to 7.1 parts. It had an RSV of 0.06 and an Mn of 1094. Infrared analysis showed 3.4% OH (Mn calculated of 1186). The polymer had a crystalline melting point of 101° C.

*Example 4*

Twenty (20) parts of a poly(trans-2-butene oxide) having an RSV of 1.2 and containing 0.1% of phenyl-β-naphthylamine as stabilizer was dissolved in 163 parts of anhydrous benzene at room temperature. With stirring and at 30° C., 1.44 parts of lithium butyl in 9 parts of n-hexane was added. Almost immediately the reactor contents solidified to a gelled mass. After 10 minutes there was added during 5 minutes 150 parts of benzene with shaking, but the reaction mixture remained a gel. Eight (8) parts of anhydrous ethanol was then added and the reaction mixture immediately became fluid. It was washed with acid and the product was isolated as described in Example 1. The product so obtained amounted to 19.0 parts, was a somewhat tough, white solid having an RSV of 0.50 and an Mn of 9242. Infrared analysis showed 0.28% hydroxyl (Mn calculated of 12,100), and no double bonds or carbonyl groups could be detected.

*Example 5*

Twenty (20) parts of a poly(trans-2-butene oxide) having an RSV of 1.1 and containing 0.1% phenyl-β-naphthylamine was dissolved in 334 parts of benzene at room temperature. A solution of 1.92 parts of lithium butyl and 12 parts of n-hexane was stirred for 15 minutes at 30° C. The product was washed with acid and was isolated as described in Example 1. It amounted to 18.8 parts and was a hard, waxy solid having an RSV of 0.16 and an Mn of 2294. Infrared analysis showed 1.1% hydroxyl (Mn calculated of 3090), no double bonds and no carbonyl. Zerewitinoff analysis showed 1.22% hydroxyl (Mn calculated of 2790).

*Example 6*

Five-tenths (0.5) part of poly(trans-2-butene oxide) having an RSV of 0.95 was dissolved in 22 parts of anhydrous benzene. Then while stirring at 30° C., 0.13 part of tert-butyl lithium dissolved in 1.3 parts of n-heptane was added. After 15 minutes, the reaction was shortstopped by adding 0.4 part of anhydrous ethanol. The reaction mixture was washed with 25 ml. of a 10% aqueous solution of hydrogen chloride, washed neutral with water, evaporated, and dried. There was isolated 0.48 part of a waxy solid having an RSV of 0.09. Infrared analysis showed 3.6% hydroxy (Mn calculated of 950) and no double bonds or carbonyl.

*Example 7*

Example 6 was repeated except that 0.23 part of phenyl potassium in 2.6 parts of n-heptane was used in place of the tert-butyl lithium. The product amounted to 0.5 part of a crystalline solid having an RSV of 0.76.

*Example 8*

A copolymer of propylene oxide and allyl glycidyl ether containing 95% propylene oxide and 5% allyl glycidyl ether was prepared by the general procedure described above, using as the catalyst a triethylaluminum—0.5 water—0.04 acetylacetone reaction product.

Ten (10) parts of the propylene oxide-allyl glycidyl ether copolymer having an RSV of 5.4 as measured on a 0.1% solution in benzene at 25° C. was dissolved in 335 parts of anhydrous benzene under nitrogen. With the temperature at 30° C. and while stirring, 0.96 part of lithium butyl in 6 parts of n-hexane was added. There was an immediate drop in the viscosity of the solution. After 15 minutes of stirring, the reaction was shortstopped by adding 4 parts of anhydrous ethanol. An equal volume of ether was added to the reaction mixture, and it was then stirred for 15 minutes with 100 ml. of a 10% aqueous solution of hydrogen chloride, after which it was washed neutral with water. The solvent was evaporated, and the product was dried. The product amounted to 9.0 parts of a viscous liquid which became grease-like on standing. It had an RSV in benzene of 0.26 and an Mn of 3600. Infrared analysis showed 0.85% hydroxyl (Mn calculated of 4000) and further established that the only unsaturation in the polymer was that from allyl glycidyl ether (1.7% allyl glycidyl ether).

*Example 9*

An amorphous polyepichlorohydrin was prepared by the general procedure described above, using as the catalyst triisobutylaluminum—0.5 water reaction product.

Ten (10) parts of this amorphous polyepichlorohydrin having an RSV of 1.6 in $\alpha$-chloronaphthalene at 100° C. and containing 1% of phenyl-$\beta$-naphthylamine as stabilizer was dissolved in 158 parts of anhydrous benzene. With the temperature at 30° C. and with stirring there was added 0.96 part of lithium butyl in 6 parts of n-hexane. After 15 minutes of stirring, 4 parts of anhydrous ethanol was added to stop the reaction. The reaction mixture was then stirred for 15 minutes with 100 ml. of a 10% aqueous solution of hydrogen chloride and washed neutral with water. The insoluble material which had separated was centrifuged out, washed once with benzene, and then dried to yield 0.72 part of a rubbery, white solid which was insoluble in acetone, indicating that it was a highly cross-linked polyepichlorohydrin (it contained by analysis 36.5% chlorine). The benzene-soluble portion of the reaction mixture was reduced in volume to about 50 ml. and the polymer was precipitated with 10 volumes of methanol. The methanol-insoluble product was collected, washed with methanol and dried. It amounted to 5.8 parts of a rubbery product which contained 37.1% chlorine and by infrared analysis showed less than 0.1% hydroxyl and no double bonds, indicating that this was unreacted polyepichlorohydrin. The methanol-soluble product was recovered by removing the solvent and drying, whereby there was obtained 1.9 parts (20% yield) of a viscous liquid having an RSV of 0.04 in $\alpha$-chloronaphthalene at 100° C. By infrared analysis it was shown to contain 2.6% hydroxyl (Mn calculated of 1300) and no double bonds.

*Example 10*

The crystalline poly(cis-2-butene oxide) used in this example was prepared by the process described in U.S. 3,065,187. This polymer (7.33 parts), having an RSV of 4.3 as measured in tetrachloroethane at 100° C. and hence an Mn >100,000 and containing 0.3% of the antioxidant Santonox, i.e., 4,4'-thiobis(6-tert-butyl-m-cresol), and having a melting point of 142° C., was dissolved in 334 parts of benzene by heating at 120° C. After cooling to 30° C., 0.96 part of lithium butyl in 6 parts of n-hexane was added. The reaction was stopped after 15 minutes by adding 4 parts of anhydrous ethanol. The reaction mixture was then washed with 100 ml. of a 10% aqueous solution of hydrogen chloride, washed neutral with water, stripped and dried. The product so obtained amounted to 6.5 parts and was a white, somewhat waxy powder, largely insoluble in benzene and chloroform at room temperature, but soluble at the boiling point of these solvents. It had a melting point of 142° C., and an Mn of 1888 (corrected for the Santonox present in the polymer). Infrared analysis showed 1.8% hydroxy (Mn calculated of 1890) and no unsaturation. The percent hydroxyl by Zerewitinoff was 1.61 (Mn calculated of 2200).

*Example 11*

Poly(isobutylene oxide) was prepared by the general procedure described above using as the catalyst triisobutylaluminum and carrying out the polymerization at −78° C.

One part of this poly(isobutylene oxide) having an RSV of 0.18 as measured in $\alpha$-chloronaphthalene at 135° C. was dissolved in 43 parts of anhydrous toluene at 135° C. The solution was then cooled to 90° C. and 0.096 part of lithium butyl in 0.6 part of n-hexane was added. The reaction mixture was stirred for 15 minutes, and the temperature dropped to 70° C. Then 0.4 part of anhydrous ethanol was added as a shortstop. The reaction mixture was then cooled to room temperature and washed many times with water saturated with carbon dioxide. It was then heated for 1.5 hours at 65–100° C. with carbon dioxide saturated water, cooled and water washed. The insoluble polymer was then collected by filtration, washed twice with benzene and dried. The product amounted to 0.80 part of a white solid which had an Mn (Rast) of 1818. Infrared analysis on a pressed film of the product indicated 1.1% hydroxyl and about 0.4% >C=CH— unsaturation. This compares with the original uncleaved poly(isobutylene oxide) which, by infrared, was shown to contain 0.2% maximum hydroxyl and 0.1%

unsaturation.

*Example 12*

A crystalline poly(phenyl glycidyl ether) was prepared using as the catalyst triethylaluminum—0.6 water reaction product.

One part of the poly(phenyl glycidyl ether) having an RSV of 3.4 as measured in $\alpha$-chloronaphthalene at 135° C. and a melting point of 198° C. was dissolved in 43 parts of anhydrous toluene at 150° C. The solution was cooled at 90° C. and treated with lithium butyl as described in Example 12. The reaction mixture after shortstopping and cooling to room temperature was washed three times with 100 ml. portions of a 10% aqueous solution of hydrogen chloride. It was washed neutral with water, and the solvent was stripped off and the polymer dried. The product so obtained amounted to 0.96 part of a slightly brown, brittle film. It had an RSV of 0.78, and infrared analysis showed the presence of about 1.8% hydroxyl and no unsaturation.

*Example 13*

This example demonstrates the cleavage of the polymer in the polymerization reaction mixture without isolation of the polymer prior to the cleavage reaction.

Fifty (50) parts of butadiene monoxide was polymerized in 400 parts of anhydrous benzene using as the catalyst triethylaluminum which had been reacted with 0.5 mole of water per mole and 1.0 mole of acetylacetone per mole of aluminum. The polymerization reaction was carried out for 19 hours at 50° C. The polymerization product was a solid mass, and a total solids sample indicated a 99% conversion to a very tough rubber. The solid mass was then dissolved in 2420 parts of anhydrous benzene, and the solution was freed of unreacted monomer by distilling off, under reduced pressure, 200 parts of the benzene. With the temperature at 30° C., 4.8 parts of lithium butyl in 30 parts of n-hexane was added. An immediate drop in viscosity of the solution occured. After stirring for 0.5 hour at 30° C., the reaction was shortstopped by adding 20 parts of anhydrous ethanol. The reaction mixture was then stirred for 2 hours with one liter of a 10% aqueous solution of hydrogen chloride. The organic layer was separated, washed neutral with water, and 0.1% of phenyl-$\beta$-naphthylamine based on the polymer was added as stabilizer, after which the solvent was removed and the product dried. There was obtained 41.3 parts (84% yield) of a product which was a soft wax at room temperature and was a viscous liquid when hot (80° C.). The product was insoluble in methanol and was soluble in benzene and chloroform. It had an Mn of 1876. Infrared analysis showed it to contain 1.3% hydroxyl and 20% vinyl unsaturation (theory is 20.0%). Thus, the product was a hydroxyl-ended polymer containing all of the vinyl side groups present in the original polymer.

Fifteen (15) parts of the above crude product was agitated with 214 parts of ether. The ether-insoluble fraction was collected, washed twice with ether, stabilized with 0.01% phenyl-β-naphthylamine and dried. It amounted to 4.11 parts (27% yield) and was a white, crystalline solid having an Mn of 13,917. Infrared analysis showed it to contain 0.2% hydroxyl and 21±1% vinyl unsaturation with no indication of any other unsaturation. It had a Kemp bromine number of 225 (theory 229) and a melting point of 75° C. The ether-soluble fraction was recovered and dried. It amounted to 10.3 parts and was a soft solid having an Mn of 1589. Infrared analysis showed it to contain 1.7% hydroxyl (Mn calculated of 2000) and 20% vinyl unsaturation. It had a Kemp bromine number of 216.

*Example 14*

Styrene oxide was polymerized according to the general procedure described above, using the catalyst triethylaluminum—1.0 acetylacetone—0.5 water reaction product.

The crystalline poly(styrene oxide), 0.97 part, having an RSV of 4.3 as measured on a 0.1% solution in α-chloronaphthalene at 135° C. and containing 0.5% Santonox as stabilizer was dissolved in 44 parts of anhydrous benzene. With the temperature at 30° C., 0.13 part of lithium butyl in 0.8 part of n-hexane was added. After stirring for 15 minutes, 0.4 part of anhydrous ethanol was added. The reaction mixture was then washed with 15 ml. of a 10% aqueous solution of hydrogen chloride and then was washed neutral with water. The product was isolated and dried. It amounted to 0.84 part of a hard, adhering solid which had an Mn of 808. Ultraviolet analysis indicated 0.5% Santonox and about 2% acetophenone, a by-product of the cleavage reaction. Infrared analysis indicated approximately 2.3% hydroxyl and no unsaturation present.

*Example 15*

A crystalline (isotactic) poly(propylene oxide) stabilized with a small amount of phenyl-β-naphthylamine and having an RSV in benzene of greater than 3 and a melting point of 70° C., was used in this example. To a solution of 9.11 parts of this poly(propylene oxide) in 387 parts of anhydrous benzene was added with stirring at 30° C., 1.28 parts of lithium butyl in 7.2 parts of n-hexane. There was an immediate large drop in the viscosity of the solution. After stirring 15 minutes at 30° C., the reaction was stopped by adding 4 parts of anhydrous ethanol. The reaction mixture was washed twice with 125 ml. portions of a 10% aqueous solution of hydrogen chloride, then washed neutral with water, filtered, stripped of solvent, and dried. Seven and two-tenths (7.2) parts (79% yield) of a brown liquid when hot (80° C.) and a soft wax when cooled to room temperature resulted. It had an Mn of 3106. Infrared analysis showed 1.0% hydroxyl (Mn calculated of 3400) and no unsaturation. Ultraviolet showed 0.05% phenyl-β-naphthylamine in the final product. It was shown to be very highly crystalline by DTA and had a melting point of 62.5° C.

*Example 16*

Example 15 was repeated except that 3.75 parts of lithium butyl was added instead of 1.28 parts. The product was like that described in Example 16 except that it had an Mn of 1100.

*Example 17*

Fifty (50) parts of a mixture of atactic and isotactic poly(propylene oxide) having a molecular weight greater than 100,000 was cleaved and isolated following the procedure described in Example 14. The total product which amounted to 43.5 g. (97% yield) was fractionated by dissolving it in 1720 parts of acetone and allowing crystallization to take place at −20° C. for 16 hours. The acetone-insoluble product was collected, washed twice with acetone at room temperature, then washed once with acetone containing 0.01% phenyl-β-naphthylamine, and then was dried. It amounted to 3.3 parts and was a hard wax having an RSV of 0.32 as measured in benzene at 25° C. and contained 0.25% phenyl-β-naphthylamine. It had an Mn of 8200 (corrected for phenyl-β-naphthyl amine), was shown to be highly crystalline by DTA and had a melting point of 70° C. Infrared analysis indicated that it contained 0.3% hydroxyl (Mn calculated of 11,000) and no carbonyl or double bonds. The acetone-soluble polymer was recovered and dried. It was 37.2 parts of a viscous liquid when hot and a grainy liquid at room temperature. It had an RSV of 0.29 in benzene at 25° C. and an Mn of 3087. Infrared analysis showed that it contained 0.7% hydroxyl (Mn calculated of 4900) and no carbonyl or unsaturation.

*Example 18*

Cyclohexene oxide was polymerized in n-heptane at −78° C. using triisobutylaluminum—0.5 water reaction product as the catalyst.

Fifteen (15) parts of the above amorphous poly(cyclohexene oxide) having an RSV of 1.9 was dissolved in 255 parts of anhydrous benzene. With stirring, 1.44 parts of lithium butyl in 9.0 parts of n-hexane was added at 30° C. After 15 minutes the reaction was stopped by adding 6 parts of anhydrous ethanol. The reaction mixture was washed with 200 ml. of a 10% aqueous solution of hydrogen chloride, stirred for 15 minutes and then washed neutral with water, stripped and dried. The product amounted to 13.6 parts (91% yield) of a hard resin having an RSV of 0.12. Infrared analysis showed the presence of 2.2% hydroxyl and 0.45% carbonyl, presumably cyclohexanone by-product of the cleavage.

Part of the above crude product (11.8 parts) was purified by dissolving it in 40 parts of benzene and then precipitating the polymer with 250 ml. of methanol. The methanol-insoluble polymer was collected, washed three times with methanol and then dried to yield 10.5 parts of a hard, brittle solid. It had an Mn of 3429. Infrared analysis showed the product to contain 1.3% hydroxyl (Mn calculated of 2620) and no carbonyl or unsaturation.

*Example 19*

Isopropyl glycidyl ether was polymerized using the above-described general procedure with triethylaluminum—0.5 acetylacetone—0.5 water reaction product as the catalyst.

Five (5) parts of this poly(isopropyl glycidyl ether) having an RSV of 4.8 as measured in coyclohexanone at 50° C. was dissolved in 110 parts of anhydrous benzene. While stirring at 30° C., 1.28 parts of lithium butyl in 7.2 parts of n-hexane was added. The very viscous solution immediately became fluid. After 15 minutes the reaction was stopped by adding 6 parts of anhydrous ethanol. The reaction mixture was then stirred for 15 minutes with 50 ml. of a 10% aqueous solution of hydrogen chloride, washed neutral with water, evaporated and dried. The product so obtained amounted to 3.4 parts (67% yield) of a viscous liquid. It had an Mn of 1080. Infrared analysis showed it to contain 2.3% hydroxyl (Mn calculated of 1480), <0.4% —CH=CH— group and no carbonyl. Thus most of the cleavage which occurred was that of the main chain.

*Example 20*

Trimethylene oxide was polymerized using as the catalyst triethylaluminum—0.5 water—0.5 acetylacetone reaction product.

To a solution, at 30° C., of 6.21 parts of the above poly(trimethylene oxide) having an RSV of 7.4, in 272 parts of anhydrous benzene was added with stirring 0.80 part of lithium butyl in 5.2 parts of n-hexane. There was an immediate reduction in viscosity of the viscous solution.

After 15 minutes' reaction, 2.5 parts of anhydrous ethanol was added. The reaction mixture was then washed several times with 10% aqueous hydrogen chloride, then with water until neutral, stripped, and dried. The product amounted to 5.0 parts (81% yield) of a very viscous liquid which on standing solidified to a highly crystalline wax and had an Mn of 3201. It contained 0.5% Santonox which had been present in the original polymer as a stabilizer. By Zerewitinoff analysis it was shown to contain 1.1% hydroxyl (Mn calculated of 3100). Infrared analysis showed approximately 1.7% hydroxyl (Mn calculated of 2000), no carbonyl and no —CH=CH—. DTA showed it to be highly crystalline with a melting point of 47° C.

*Example 21*

The poly(tetrahydrofuran) used in this example was prepared by bulk polymerization of tetrahydrofuran at 0° C. with phosphorus pentafluoride as catalyst.

Three (3) parts of this poly(tetrahydrofuran), having an RSV of 10.7, was dissolved in 132 parts of anhydrous benzene. Then, while stirring the very viscous solution at 30° C., 0.39 part of lithium butyl in 2.5 parts of n-hexane was added. After about 10 minutes, the reaction mixture was very fluid. After 15 minutes an additional portion (0.20 part) of lithium butyl was added, and the reaction mixture was stirred an additional 30 minutes, after which it was shortstopped by adding 1.2 parts of anhydrous ethanol. It was washed with 75 ml. of 10% aqueous hydrogen chloride, washed neutral with water and then stripped and dried. The product so obtained amounted to 2.92 parts (97% yield) of a waxy solid having an Mn of 1861. It was shown to have high crystallinity by X-ray. Infrared analysis showed approximately 2.6% hydroxyl (Mn calculated of 1310), no carbonyl and no

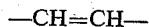

—CH=CH— was detected.

*Example 22*

Trimethylene sulfide (29.5 parts) was polymerized at 30° C. for 139 hours using a total of 2.7 parts of diethylzinc which had been reacted with 0.9 mole of water in 28 parts of a 77:23 mixture of ether and n-heptane, the catalyst being added in 2 equal parts at 0 and 94 hours. After stopping the reaction by adding 12 parts of anhydrous ethanol, the reaction mixture was washed twice with 3% aqueous hydrogen chloride, washed neutral with water, washed once with a 2% aqueous solution of sodium bicarbonate and again washed neutral with water. The ether-insoluble polymer recovered was washed twice with ether and then once with ether containing 0.05% of phenyl-β-naphthylamine as stabilizer, after which it was dried for 16 hours at 80° C. under vacuum. The polymer was obtained in a 36% conversion, and it was a crystalline polymer having an RSV of 3.3.

One part of the poly(trimethylene sulfide) so prepared was dissolved in 84 parts of anhydrous benzene by heating the mixture at 120° C. The solution was centrifuged while hot to remove some insoluble catalyst residue. The supernatant was then stirred at 69° C., and 0.80 part of lithium butyl was added. After 15 minutes the reaction was stopped by adding 1.6 parts of anhydrous ethanol. The reaction mixture was then allowed to stand for 3 days at room temperature, after which it was washed with 50 ml. of a 10% aqueous solution of hydrogen chloride, and washed neutral with water. An insoluble fraction was collected, washed once with benzene and then with 0.005% phenyl-β-naphthylamine in benzene. After drying, there was obtained a tough, hard solid (0.3 part) which had an RSV of 1.7. The molecular weight was too high to determine the end groups. The benzene soluble product was recovered by evaporation and drying. It amounted to 0.5 part and was a hard, brittle film having an RSV of 0.49 and an Mn of 3678.

*Example 23*

One part of the poly(trimethylene sulfide) prepared in Example 23, but which had been purified and dried and had an RSV of 3.0, was dissolved in 84 parts of anhydrous benzene by heating at 90° C. After cooling to 70° C. and with stirring, 1.15 parts of lithium butyl was added. The reaction mixture was then stirred for 4 hours at 75° C., after which the reaction was stopped by adding 1.6 parts of anhydrous ethanol. The reaction mixture was washed at room temperature with 50 ml. of a 10% aqueous solution of hydrogen chloride (stirred for 30 minutes), washed neutral with water, filtered, evaporated and dried. The product so obtained was a hard, waxy solid (it was a viscous liquid at 80° C.) and amounted to 0.94 part (95% yield). It had an RSV of 0.16 and an MN of 1745.

*Example 24*

Five (5) parts of N-n-butylethyleneimine in 33.8 parts of toluene was cooled to —78° C. under nitrogen, and 8.0 ml. of boron trifluoride gas was added initially and then again after one hour. After 19 hours at —78° C. the polymerization was stopped by adding 2 parts of anhydrous ethanol. The reaction mixture was then washed with 10% aqueous sodium hydroxide and then was water-washed 10 times, and finally was stabilized by adding 0.7% based on the weight of the polymer with Santonox as stabilizer. The solvent was removed, and the product was dried for 16 hours at 80° C. under vacuum. There was thus obtained 3.6 parts (72% conversion) of a viscous, amber liquid polymer which had an RSV of 0.07. Analysis showed that it contained 13.1% nitrogen (theory for $C_6H_{13}N$ is 14.1% nitrogen). Infrared analysis showed that the polymer contained less than 0.2% NH groups, and no terminal unsaturation could be detected.

One part of the above polyimine was mixed with 34 parts of n-heptane under nitrogen. After heating on a steam bath and cooling to 30° C., a fraction remained undissolved. While agitating at 30° C., 0.96 part of lithium butyl in 6 parts of n-hexane was added. After 18 hours the reaction was stopped by adding 2.0 parts of anhydrous ethanol. The solvent was stripped off, and the product was dissolved in toluene and washed with water until neutral. A trace of insoluble product was removed, and the soluble material was recovered by stripping off the solvent and drying for 16 hours at 80° C. under vacuum. There was obtained 0.78 part of a fluid, brown liquid with an Mn of 466 (degree of polymerization of about 5). Infrared analysis showed 3.4% NH and that double bonds were present, estimated at about 0.3–0.7% vinyl (calculated as $CH_2=$), no suitable standards being available. The Mn calculated based on the NH groups found and assuming 2 end groups per chain was 880. Thus a large fraction of this product has NH end groups (2 per chain) and part has NH and vinyl type end groups.

*Example 25*

Propylene sulfide, 5.6 parts, was polymerized under nitrogen with diethylzinc which had been reacted with 0.9 mole of water as catalyst (as described in Example 23), polymerization taking place at room temperature for 19 hours. The polymerization was shortstopped by adding 2 parts of anhydrous ethanol. The reaction mixture was dispersed in ether and was washed twice with 3% aqueous hydrogen chloride, washed neutral with water, washed once with 2% aqueous sodium bicarbonate solution and again washed neutral with water. The ether-insoluble product was collected, washed twice with ether and once with 0.01% of Santonox in ether, after which it was dried for 16 hours at 80° C. under vacuum. The product was obtained in a 95% conversion and was a snappy rubber with an RSV of 1.5 and was shown to be amorphous by X-ray.

One part of the above poly(propylene sulfide) was dissolved in 44 parts of anhydrous benzene under nitrogen.

With stirring there was added at 30° C., 0.19 part of lithium butyl in 1.2 parts of n-hexane. There was a gradual decrease in viscosity. After 2.2 hours, the reaction was stopped by adding 0.4 part of anhydrous ethanol. The reaction mixture was then stirred for 15 minutes with 10% aqueous hydrogen chloride, washed neutral with water, filtered, stripped, and dried for 16 hours at 80° C. under vacuum. The product so obtained amounted to 0.88 part and was a viscous liquid with an Mn of 1381. Analysis for percent SH end groups by iodine titration in chlorobenzene showed 4.9% present. The Mn calculated from this percent SH, assuming 2 SH per chain, was 1350.

Example 26

Fifty (50) parts of propylene sulfide in 242 parts of anhydrous toluene was treated under nitrogen at 30° C. with 0.60 part of diethylzinc which had been reacted with 0.9 mole of water as described in Example 23. After 19 hours of polymerization at 30° C., the reaction was shortstopped by adding 20 parts of anhydrous ethanol. The reaction mixture was diluted with toluene, and the reaction mixture was washed with aqueous hydrogen chloride, water, and sodium bicarbonate as described in Example 24. The product was soluble in the solvent, and, after stabilization by adding 0.1% phenyl-$\beta$-naphthylamine, it was recovered by evaporation and dried for 16 hours at 80° C. under vacuum. The polymer was obtained in a 100% conversion, had an RSV of 3.4 and contained less than 0.05% SH (iodine titration in chlorobenzene).

Twenty-five (25) parts of this poly(propylene sulfide) was dissolved in 1100 parts of anhydrous benzene under nitrogen. Then while stirring at 30° C., 4.8 parts of lithium butyl in 30 parts of n-hexane was added. After stirring for 2.2 hours at 30 to 25° C., the reaction was stopped by adding 10 parts of anhydrous ethanol. After 5 minutes, 625 ml. of a 10% aqueous solution of hydrogen chloride was added, and the temperature was raised to 60° C. and held there for 1.5 hours. The mixture was then cooled and washed neutral with water, filtered, evaporated and the product dried for 16 hours at 80° C. under vacuum to yield 24.8 parts of a viscous liquid having an RSV of 0.12 and an Mn of 1316. Analysis showed it to contain 5.8% SH by iodine titration in chlorobenzene. (The product formed in the analytical method was a high molecular weight polysulfide containing disulfide links.) The Mn calculated from percent SH and based on 2SH per chain was 1140.

This product was tested as a flexibilizer for a bisphenol A—Epon resin in a weight ratio of 1:2, respectively, and found to be more effective in reducing modulus than a commercially used polysulfide flexibilizer.

Example 27

Five-tenth (0.5) part of a crystalline poly(trans-2-butene oxide) having an RSV of 0.95 was dissolved in 22 parts of anhydrous benzene under nitrogen. Then, at 30° C., 0.28 part of lithium phenyl in 1.5 parts of a 1:2 ether:benzene solvent was added. There was an immediate brownish, gummy precipitate. The reaction mixture was shaken vigorously on a wrist-action type shaker for 1.5 hours at room temperature, after which 0.4 part of anhydrous ethanol was added. The mixture was washed with 25 ml. of a 10% solution of aqueous hydrogen chloride (stirred 15 minutes), washed neutral with water, and then dried for 16 hours at 80° C. under vacuum. There was obtained 0.37 part (74% yield) of a soft wax having an Mn of 445. Infrared analysis showed it to contain 6.7% hydroxyl, no carbonyl and no unsaturation. The Mn calculated from the infrared and assuming 2OH per chain was 507.

The following examples illustrate the preparation of polyurethanes from the hydroxyl ended polymers produced in accordance with this invention.

Example 28

The poly(trans-2-butene oxide) diol (1.000 part) prepared in Example 5 was mixed with 0.112 part of methylene di-p-phenyl diisocyanate, which was 97.5% pure based on isocyanate content, and 3.5 parts of anhydrous benzene. This was 100% of the theoretical amount of the diisocyanate based on the diol having a number average molecular weight of 2294 and using 1 mole of diisocyanate per mole of the diol. The mixture was heated for 6 hours at 120° C. after which the solvent was evaporated off under nitrogen on a steam bath and the product was dried for 16 hours at 80° C. under vacuum. The product so obtained was 95% soluble in benzene and the soluble fraction had an RSV of 0.69. It was a hard, tough solid which adhered strongly to glass and which could be cold drawn.

Example 29

This example demonstrates the preparation of a poly(trans-2-butene oxide) diol where each hydroxyl is reacted with a triisocyanate to yield a tetraisocyanate.

The poly(trans-2-butene oxide) diol (1.048 parts) of Example 5 was mixed, under nitrogen, with 3.98 parts of a benzene solution (2.72% NCO) of the reaction product of 3 moles of toluene diisocyanate with 1 mole of trimethylolpropane. This corresponds to a 6% excess over that required for 3 NCO per hydroxyl (based on a Mn of 2294 and 1.48% hydroxyl). After heating for 6 hours at 120° C., part of the very viscous solution of this tetraisocyanate was cast as a film on a glass plate. The film was non-tacky and after 10 days in air at room temperature the film was removed from the glass to yield an unsupported free film.

The remainder of the tetraisocyanate solution was then heated at 100° C. to remove the solvent, after which it was heated under nitrogen at 90° C. for 22 hours. The product was then extracted with 3.5 parts of anhydrous methyl isobutyl ketone, whereby 0.14 part of a wax-like product was removed. It was then extracted with 5 parts of benzene for 3 days and again with 6 parts of benzene for 24 hours. After two further benzene washes, the insoluble product was dried for 16 hours at 80° C. under vacuum to yield 1.194 parts of a film-like, tough solid.

Example 30

The poly(trans-2-butene oxide) diol (1.048 parts) of Example 5 was mixed under nitrogen, with 1.33 parts of a benzene solution of the reaction product of 3 moles of toluene diisocyanate with 1 mole of trimethylolpropane (2.72% NCO). This corresponds to a 6% excess over 1 isocyanate per hydroxyl, based on an Mn of 2294 and 1.48% hydroxyl. The mixture was heated at 120° C. for 6 hours, after which the solvent was vented and the reaction mixture evacuated for 1 minute at 120° C. During the next 6 hours of heating at 120° C., the reaction mixture became a solid, but somewhat cheesy mass. Heating was continued for an additional 23 hours after which the solid mass was dried for 16 hours at 80° C. under vacuum. The product was a tough, rubbery solid. It was extracted with benzene for 3 days at room temperature and then washed 3 times with benzene. The dried benzene-insoluble product was a tough solid and amounted to 0.965 part. The benzene-soluble fraction was recovered and amounted to 0.27 part. It was a brittle, slightly waxy film.

Example 31

One part of the crystalline poly(propylene oxide) diol prepared in Example 15 was mixed under nitrogen with 3.5 parts of anhydrous benzene and 0.076 part of methylene di-p-phenyl diisocyanate (98% of the theoretical amount based on an Mn of 3106). The mixture was heated at 120° C. for 6 hours, after which the solvent was removed by evaporation under nitrogen on a steam bath and the residue was dried for 16 hours at 80° C. under vacuum. The product so obtained amounted to 1.064 parts and was a tough solid.

The following example illustrates the process of this invention used to cleave a polymer down to a monomeric diol product.

*Example 32*

Five-tenths (0.5) part of a highly crystalline poly(trans-butene-2 oxide) having an RSV of 1.2 and 17 parts of n-heptane were heated to 120° C. under nitrogen in a sealed tube to dissolve the polymer. The solution was cooled to 15° C. and then, while stirring, 0.94 part of amylsodium in 6 parts of n-heptane was added over a period of 7 minutes. Then six more equal portions of amylsodium were added at 15 minute intervals, using 3–5 minutes to add each portion. After a total of 2.5 hours of stirring at 15° C., the temperature was raised to 20–25° C. and the mixture was stirred another 2.5 hours.

A portion of this cleavage reaction mixture was removed, anhydrous ethanol was added, and then at 0° C. the mixture was acidified with hydrochloric acid to a pH of 8–9. The insolubles were centrifuged out and washed with anhydrous ethanol. The ethanol layers were combined, acidified to a pH of 2.4 with 3% aqueous hydrochloric acid, allowed to stand for 6 hours at room temperature and then was neutralized with aqueous sodium hydroxide until slightly alkaline. Analysis by gas chromatography showed that only 4% of the theoretical amount of meso-2,3-butanediol was present. The alcohol and water-insoluble fraction amounted to 78% and was a tough, chloroform-soluble solid having a RSV of 0.62.

Another portion of the cleavage reaction mixture was removed, stirred for 17 hours at 35° C. and then for 21 hours at 65° C. Anhydrous ethanol was then added and the cleavage mixture was treated with acid and neutralized as described above. By gas chromatography, meso-2,3-butanediol was found present and represented 64% of the theoretical yield (20 weight percent of the original polymer), assuming amylsodium attacks all of the beta hydrogens in a random manner. There was no dl-2,3-butanediol detected. The alcohol-insoluble material, after removing sodium chloride by water washing, was a solid which amounted to only 3% of the original polymer, demonstrating that essentially all of the polymer had cleaved.

The foregoing examples demonstrate the process of this invention applied to a wide variety of high molecular weight polyethers, polythioethers and polyimines, and to the production of cleavage products with active end groups at both ends of the polymer chain and of any desired degree of cleavage. Thus the process of this invention provides a ready source of hydroxyl-, mercapto- and secondary amino-ended polymers, which are useful in the preparation of cross-linked, foamed articles of good mechanical properties. It is well known that liquid, amorphous, low molecular weight poly(propylene glycols) and/or propylene oxide adducts of polyols have proven of great value when chain extended. The active-ended products produced by this invention can also be used in chain extension reactions. The chain extending agents can be any polyfunctional compound which reacts under appropriate temperature, pressure and catalyst with hydroxyl, mercapto, or secondary amino groups. They can be di- or polyisocyanate such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins as, for example, the diglycidyl ether of Bis Phenol–A, or di- or tri-azaridines as, for example, tris[1-(2-methyl) aziridinyl] phosphine oxide, tris(1-aziridinyl) phosphine oxide, or di- or poly-anhydrides such as pyromellitic anhydride, or di- or polyimides such as phenylene bis-maleimide, etc. The difunctional chain extending agents are generally used in approximately stoichiometric amounts to the active chain ends when a linear, soluble high polymer product is desired. When the chain extending agent contains more than 2 functional groups and is used in approximately stoichiometric amounts to the active chain ends the product is generally a cross-linked product. Alternatively, a cross-linked network can be obtained by using a combination of a difunctional active chain end polymer with low molecular weight similar poly reactive compounds. Thus, in the case of the polymers with hydroxyls on both ends of the polymer chain, a combination with a polyol such as glycerin, pentaerythritol, trimethylol propane, sorbitol, tetrakis (2-hydroxypropyl) ethylene diamine, or ethylene oxide or propylene oxide adducts of these polyols in combination with the diisocyanate will yield a cross-linked polyurethane network.

The reactive chain ended polymers produced by the process of this invention are also very useful for preparing block copolymers particularly for the combination of dissimilar blocks as, for example, the preparation of block copolymers containing blocks of crystalline poly(propylene oxide) or crystalline poly(trans- or cis-butene-2 oxide) combined with amorphous poly(pyropylene glycol) blocks, which block copolymers are particularly useful in conventional polyurethane foam technology to yield foams of improved strength, abrasion resistance, hardness and rigidity, depending, of course, on the composition of the block copolymer. Another type of block copolymer that may be prepared from the cleavage products is that derived from the poly(N-alkyl ethylene imine) having >NH end groups on each end of the chain, combined with 2 moles of toluene diisocyanate to yield a polymer with the >NH end groups converted to

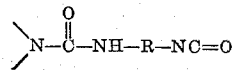

groups, i.e. reactive isocyanate end groups, and this isocyanate ended product reacted with a diol obtained from poly(propylene oxide), poly(ethylene oxide), poly(octadecene-1 oxide), etc., to yield water- or acid-soluble or dispersible block copolymers useful as flocculating agents, emulsifiers, wetting agents, dry- and wet-strength paper additives, paper size additives, antistatic agents, etc.

The diol and diamine cleavage products produced by the process of this invention can also be converted to useful polyester and polyamide block copolymers by the usual polyester and polyamide forming reactions, using either a simple monomeric unit such as the phthalic acids or esters, or using preformed polyesters of polyamides with appropriate reactive chain ends.

The process of this invention has also made possible the production of entirely new polyethers with hydroxyls at both ends, polythioethers with mercapto groups at both ends, and polyimines with secondary amino groups at both ends. The crystalline or crystallizable active chain end polymers which can be produced are especially unique and desirable, not having been available heretofore. They contribute the desirable properties inherent in crystalline polymers as, for example, hardness, toughness, solvent resistance, etc., to many fields where the prior art high molecular weight crystalline polymers could not be used because of fabrication, adhesion or application difficulties. These materials are very useful for coatings (urethane type, melamine-formaldehyde type, alkyds); foams (rigid, semi-rigid, and elastomeric); cast articles (rigid and elastomeric); as vulcanizable elastomers; elastomeric fibers, adhesives, films, potting resins, injection molded articles, etc.

The crystalline poly(propylene glycol) prepared as described above is particularly useful in the preparation of polyurethane foams in combination with amorphous poly (propylene glycol) and depending on the composition will be rigid, semi-rigid or elastomeric. This crystalline poly (propylene glycol) is also especially useful in elastomeric foams because of the good low temperature properties and high strength on stretching of the foam so produced. The crystalline poly(propylene glycol) is useful in rigid and semi-rigid foams where it is the sole or major diol component combined with a diisocyanate such as toluene diisocyanate or with a diisocyanate in combination with a small amount of a polyol such as trimethylol propane. Ordinary amorphous poly(propylene glycol) would not be useful in the preparation of rigid or semi-rigid foams unless it were combined with a very large amount of a polyol or polyisocyanate so as to give a high degree of cross-linking. In any event, the rigid foams from the crystalline poly(propylene glycol) are tougher and hence more useful at ordinary temperatures. The crystalline poly(propylene glycol) can also be used for the preparation of cast articles, for coatings, for binders as, for example, rocket propellants, and for elastomeric fibers, films, etc.

The diols produced as described above from crystalline poly(trans- or cis-butene-2 oxide) can, of course, be used in the same way as the crystalline poly(propylene glycol), but, having higher melting points, give the final products advantageous properties due to crystallinity over a wider temperature range.

The diols produced from poly(cyclohexene oxide) and poly(styrene oxide) are also interesting new products. The diol of poly(cyclohexene oxide) is useful for making harder, more rigid polyurethane foams, coatings, or cast articles. In this case the rigidity is not due to crystallinity of the polyol but instead due to greater stiffness of the amorphous polymer chain. The same is true of the amorphous diol polymer or crystalline diol polymer in the amorphous state produced from poly(styrene oxide) but the latter diols have much better adhesion to a variety of surfaces. The crystalline diol polymer produced from poly(styrene oxide) has the added advantage of solvent resistance due to crystallinity.

Another valuable product produced by the process of this invention is the cleavage product obtained from poly (butadiene monoxide), which cleavage product has hydroxyl ended groups and ethylene double bond end groups. This polymer provides a means of making a high energy rocket propellant binder by adding energetic groups such as $N_2O_4$ to the double bonds, which modified polymer could not be made, due to these very reactive groups by first preparing the polyether and cleaving it. Both the crystalline and amorphous cleavage products obtained from poly(butadiene monoxide) may be modified by adding halogen, carbon tetrachloride, chloroform, etc., to the double bond end groups. The cleavage product may also be used for the preparation of block copolymers as, for example, a copolymer containing blocks of poly(propylene glycol), which block copolymers can be readily sulfur vulcanized to yield elastomeric forms, fibers, etc.

The linear, hydroxyl ended, cleavage product produced from poly(trimethylene oxide) provides superior properties for polyurethane foams either alone or in combination with other polyols as, for example, poly(propylene glycol), particularly in elastomeric foams. This poly(trimethylene oxide)diol yields a foam with better low temperatures and strength properties than can be obtained in any other elastomeric polyurethane foam without excessive water absorption. In rigid and semi-rigid polyurethane foams, it not only yields a foam with superior properties but in addition it can be cross-linked to a higher degree and still retain these superior properties. Because it contains solely primary hydroxyls, it makes possible a faster and more complete reaction with isocyanates, epoxides, aziridines, etc.

The new mercapto ended polymers produced by cleavage of polysulfides such as poly(trimethylene sulfide) and poly(propylene sulfide) are very useful as modifiers and flexibilizers for Epon resins in the preparation of cast articles, coatings, sealants, laminates, adhesives, etc. These dimercaptans can be chain extended by oxidation to form a unique polymeric sulfide joined by disulfide links. This oxidation can be accomplished by means of air, iodine, lead dioxide, manganese dioxide, chlorates, perchlorates, peroxides such as cumene hydroperoxide, etc. Such oxidation products used for coatings, for cast articles, for sealants, laminates, adhesives, etc., have excellent weathering stability and good solvent resistance. Chain extension of these dimercaptans can also be accomplished with appropriate metal salts, zinc oxide, lead oxide, and cadmium oxide, etc. Other agents which are useful for chain extending and/or cross-linking these dimercaptan ended polymers are di- and polyisocyanate, reactive phenols or phenol formaldehyde resins, diepoxy resins, organic titanates, organic nitro compounds, quinone di-oxime, etc. These dimercapto ended polysulfide polymers are superior to the conventional polysulfide polymers in that they have better hydrolytic and oxidative stability due to the absence of the reactive formal and reactive disulfide groups present in large amounts in most commercial polysulfide polymers. The cleavage products from poly(trimethylene sulfide) are especially useful because of their crystallinity which leads to tougher, harder products and because of their inherent low temperature properties. The cleavage products from amorphous poly(propylene sulfide) are outstandingly superior to conventional polysulfides because while retaining their very useful liquid properties for ease of fabrication, they are more stable to hydrolysis, oxidation and heat.

The products produced on cleaving poly(N-substituted ethylene imines) and having reactive chain ends have not been available heretofore. As pointed out above, these reactive chain ends can both be >NH groups or one can be a >NH group and the other an unsaturated group. In the case of a poly(N-cycloalkyl imine) where the cycloalkyl group is attached to the main chain as in poly(conidine) where the monomer unit is

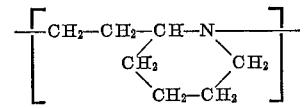

the cleavage yields not only 2 >NH groups per chain, but also one aldehyde group per chain. These new polyimines having amino chain ends are particularly useful for preparing block copolymers of unique properties. Thus, blocks of the polyamine can be combined, by reaction with diisocyanates, with blocks of a polyether such as poly(ethylene glycol), poly(propylene glycol), poly (octadecenyl glycol), etc., or with polyester, polyamides, polyurethanes or polyureas, etc., as, for example, hydroxyl or carboxyl terminated polyesters such as poly (ethylene phthalates), poly(ethylene maleates), poly ethylene adipates), or amine or carboxyl terminated amides such as poly(hexamethylene adipamide), etc. These water- and/or acid-soluble or dispersible products are useful as surface active agents, emulsifiers, wetting agents, detergents, antistatic agents, wet and dry strength paper additives, paper sizing agents, etc., adhesive components, flocculating agents, etc. These new diamino polyimines can also be reacted with diacrylates such as ethylene diacrylate, ethylene dimethacrylate, diacrylamides such as methylene bisacrylamide, etc., to yield high polymers having interesting surface active properties.

The cleavage products having OH, SH or >NH end groups combined with unsaturated end groups, especially where the unsaturated end group is a stable one such as an allyl group, can be used in combination with monomers such as acrylates, methacrylates, maleic anhydride, styrene, etc., which copolymerize with such unsaturated groups, to yield polymers useful in reinforced articles with improved properties, particularly because of their improved adhesion to the reinforcing filler as, for example, glass fiber.

Many other uses of the cleavage products produced in accordance with this invention can be cited. Thus, the active chain end polymers obtained by the process of this invention can be prereacted with reactive agents such as diisocyanate, phosgene, dianhydrides, etc., and then reacted with other difunctional or polyfunctional agents such as water, polyols, polyamines, etc., to form useful high polymers. For example, a hydroxyl ended polymer reacted with phosgene yields a chloroformate which can be converted to a polyamide by reacting with a diamine by the well-known method of interfacial polymerization. Another example is the reaction of an active hydrogen chain end with acrylonitrile to give cyanoethyl end groups which can then be reduced to amino groups and used for subsequent reaction or polymerization. Other applications for these cleavage products will be apparent to those skilled in the art.

What I claim and desire to protect by Letters Patent is:

1. The process of cleaving a polymer selected from the group consisting of polyethers, polythioethers, and polyimines comprising reacting said polymer, at a temperature of from about −50° C. to about 200° C., with an organometallic compound of an alkali metal wherein the organo moiety is selected from the group consisting of alkyl, aryl, alkenyl, alkynyl, cycloalkyl, cycloalkenyl and aralkyl, said polymer being cleaved containing sequences of at least 2 monomer units having the formula

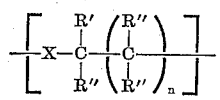

where X is selected from the group consisting of O, S and NR; R is selected from the group consisting of alkyl, cycloalkyl, aryl, aralkyl, alkoxyalkyl and together with R′ forms a cyclic structure; R′ is selected from the group consisting of H, alkyl, alkenyl, haloalkyl, cycloalkyl, aryl, aralkyl, alkoxyalkyl, aryloxyalkyl, alkenyloxyalkyl, alkenylaryloxyalkyl, and together with R″ forms a cyclic structure; R″ is selected from the group consisting of H, alkyl, alkenyl, alkoxyalkyl, alkenyloxyalkyl, haloalkyl, alkenylaryloxyalkyl, and a cyclic structure formed with R′; at least one of said R′ and R″ groups in said sequences of said monomer units having a hydrogen attached to a carbon in the beta position to X; and $n$ is any whole number.

2. The process of claim 1 wherein the cleavage reaction is carried out in the presence of an inert, liquid, organic diluent.

3. The process of claim 2 wherein the reaction mixture is washed with an aqueous solution having a pH of at least 7 before isolating the product.

4. The process of claim 2 wherein the reaction mixture is treated with an aqueous acid solution before isolating the product.

5. The process of claim 2 wherein the polymer that is cleaved is poly(propylene oxide).

6. The process of claim 2 wherein the polymer that is cleaved is a poly(butene-2 oxide).

7. The process of claim 2 wherein the polymer that is cleaved is poly(propylene sulfide).

8. The process of claim 2 wherein the polymer that is cleaved is a poly(N-alkyl ethylene imine).

9. The process of preparing a poly(propylene glycol) which comprises reacting poly(propylene oxide) at a temperature of from about −50° C. to about 200° C. in the presence of an inert, liquid, organic diluent with an organometallic compound of an alkali metal wherein the organo moiety is selected from the group consisting of alkyl, aryl, alkenyl, alkynyl, cycloalkyl, cycloalkenyl and aralkyl, and washing the reaction mixture with an aqueous acid solution prior to separating the product from the organic diluent.

10. The process of preparing a diol of poly(trans-butene-2 oxide) wherein the hydroxyl groups are terminal end groups, which comprises reacting poly(trans-butene-2 oxide) at a temperature of from about −50° C. to about 200° C. in the presence of an inert, liquid, organic diluent with an organometallic compound of an alkali metal wherein the organo moiety is selected from the group consisting of alkyl, aryl, alkenyl, alkynyl, cycloalkyl, cycloalkenyl and aralkyl, and washing the reaction mixture with an aqueous acid solution prior to separating the product from the organic diluent.

11. The process of preparing a dithiol of a poly(propylene sulfide) wherein the thiol groups are terminal endgroups, which comprises reacting poly(propylene sulfide) at a temperature of from about −50° C. to about 200° C. in the presence of an inert, liquid, organic diluent with an organometallic compound of an alkali metal wherein the organo moiety is selected from the group consisting of alkyl, aryl, alkenyl, alkynyl, cycloalkyl, cycloalkenyl and aralkyl, and washing the reaction mixture with an aqueous acid solution prior to separating the product from the organic diluent.

12. The process of claim 9 wherein the organometallic compound is an alkali metal alkyl.

13. The process of claim 10 wherein the organometallic compound is an alkali metal alkyl.

14. The process of claim 11 wherein the organometallic compound is an alkali metal alkyl.

References Cited

UNITED STATES PATENTS 2,919,262   12/1959   Nummy _____ 260—79.1
3,201,367   8/1965    Smith _____ 260—2

LEON J. BERCOVITZ, *Primary Examiner.*

M. I. MARQUIS, *Assistant Examiner.*